(12) United States Patent
Haruta

(10) Patent No.: US 10,070,008 B2
(45) Date of Patent: Sep. 4, 2018

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Kenichirou Haruta, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 15/334,876

(22) Filed: Oct. 26, 2016

(65) Prior Publication Data
US 2017/0150008 A1   May 25, 2017

(30) Foreign Application Priority Data
Nov. 19, 2015   (JP) ................................ 2015-227067

(51) Int. Cl.
| | |
|---|---|
| *H04N 1/60* | (2006.01) |
| *H04N 1/58* | (2006.01) |
| *H04N 1/52* | (2006.01) |
| *H04N 1/405* | (2006.01) |
| *H04N 1/00* | (2006.01) |
| *H04N 1/409* | (2006.01) |

(52) U.S. Cl.
CPC ......... *H04N 1/405* (2013.01); *H04N 1/00748* (2013.01); *H04N 1/4055* (2013.01); *H04N 1/4092* (2013.01); *H04N 1/52* (2013.01); *H04N 2201/0094* (2013.01)

(58) Field of Classification Search
None
See application file for complete search history.

(56) References Cited

U.S. PATENT DOCUMENTS 4,709,274 A * 11/1987 Tanioka ............. H04N 1/40062
358/2.1
5,862,264 A * 1/1999 Ishikawa ................ G06T 9/001
382/249

(Continued)

FOREIGN PATENT DOCUMENTS

CN   1767585   5/2006
CN   101867682   10/2010

(Continued)

OTHER PUBLICATIONS

Office Action dated Jul. 3, 2018 in counterpart Chinese Application No. 2016-11005252.9, together with English translation thereof.

*Primary Examiner* — Madelein T Nguyen
(74) *Attorney, Agent, or Firm* — Fitzpatrick, Cella, Harper & Scinto

(57) ABSTRACT

An image processing apparatus of the present invention performs halftone processing with respect to first image data to generate second image data. In such a case, based on a threshold and values of a plurality of pixels in a reference area that includes a target pixel of first image data, whether or not the target pixel is included in an edge portion is determined, and a pixel value of second image data corresponding to the target pixel determined to be included in the edge portion is corrected by using correction data generated from the value of the target pixel.

9 Claims, 10 Drawing Sheets

(56) References Cited

U.S. PATENT DOCUMENTS

| | | | |
|---|---|---|---|
| 6,271,868 B1* | 8/2001 | Kashihara | G03G 15/011 347/115 |
| 6,795,576 B2* | 9/2004 | Uchida | H04N 1/58 358/501 |
| 7,706,021 B2 | 4/2010 | Kaburagi | |
| 8,619,328 B2 | 12/2013 | Kashibuchi et al. | 358/3.06 |
| 8,649,061 B2 | 2/2014 | Keithley et al. | 358/3.06 |
| 9,485,388 B2* | 11/2016 | Kodama | H04N 1/40 |
| 9,632,448 B2* | 4/2017 | Itagaki | G03G 15/04027 |
| 2005/0270582 A1* | 12/2005 | Hara | H04N 1/405 358/2.1 |
| 2007/0030503 A1* | 2/2007 | Tonami | H04N 1/40087 358/1.9 |
| 2008/0007785 A1* | 1/2008 | Hashii | H04N 1/4072 358/3.01 |
| 2009/0097074 A1* | 4/2009 | Kawamura | H04N 1/4055 358/3.13 |
| 2010/0040291 A1* | 2/2010 | Genda | G06T 3/403 382/199 |
| 2011/0064328 A1* | 3/2011 | Ishizuka | H04N 1/409 382/266 |
| 2011/0116139 A1* | 5/2011 | Tsutsumi | H04N 1/4056 358/3.26 |
| 2011/0242174 A1* | 10/2011 | Kakutani | G06K 15/1874 347/15 |
| 2012/0147430 A1* | 6/2012 | Kashibuchi | H04N 1/405 358/3.27 |
| 2012/0206756 A1* | 8/2012 | Nakashio | H04N 1/00015 358/1.14 |
| 2013/0027751 A1* | 1/2013 | Uchidate | H04N 1/4074 358/3.03 |
| 2016/0034798 A1* | 2/2016 | Kodama | H04N 1/405 358/3.06 |
| 2016/0057312 A1 | 2/2016 | Haruta | |
| 2017/0150008 A1* | 5/2017 | Haruta | H04N 1/00748 |

FOREIGN PATENT DOCUMENTS

| | | |
|---|---|---|
| JP | H10-042141 A | 2/1998 |
| JP | 2006-033225 | 2/2006 |
| JP | 2006-295877 A | 10/2006 |

\* cited by examiner

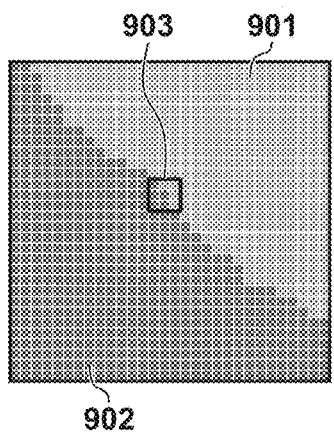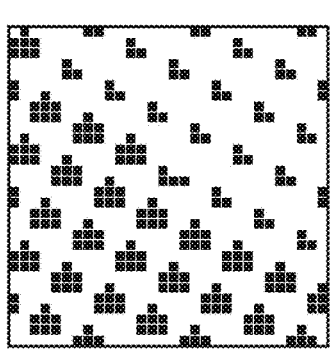
FIG. 9A  FIG. 9B
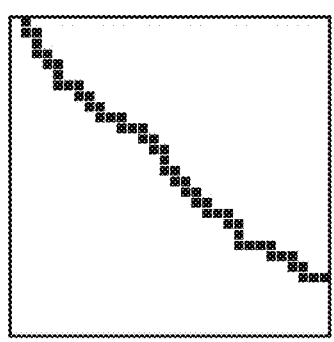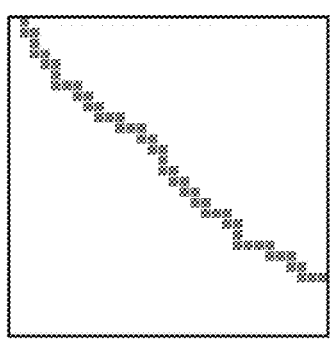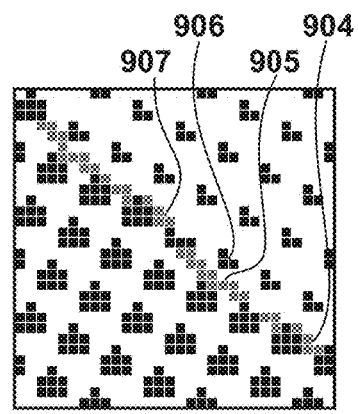
FIG. 9C  FIG. 9D  FIG. 9E
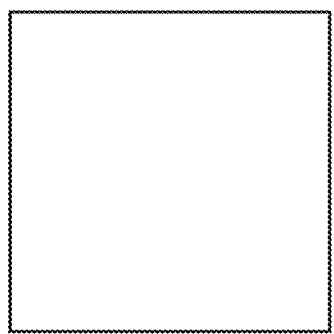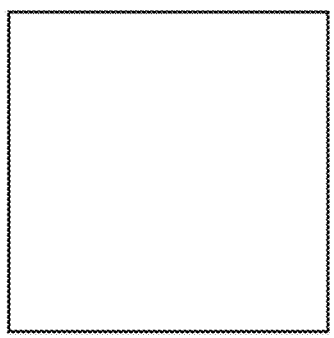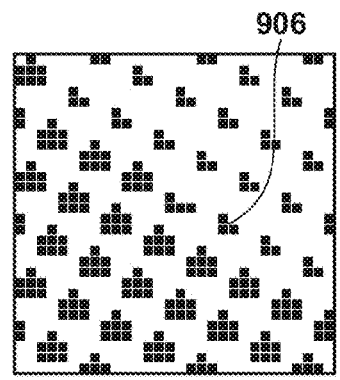
FIG. 9F  FIG. 9G  FIG. 9H

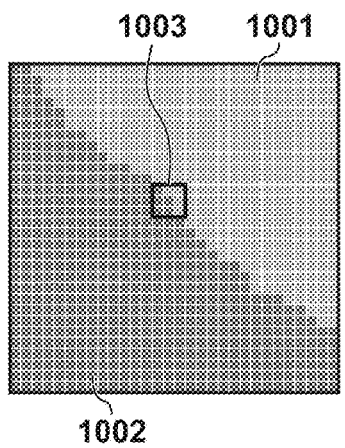
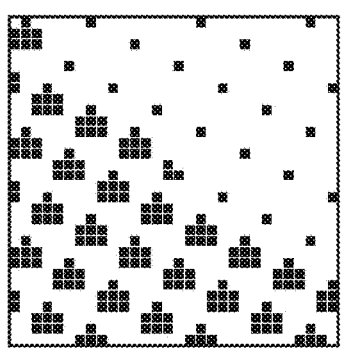
FIG. 10A    FIG. 10B
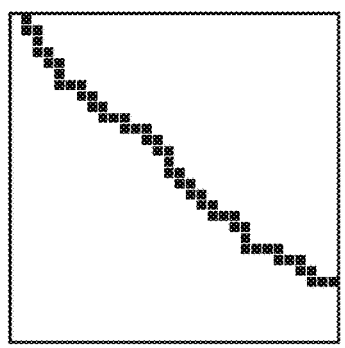
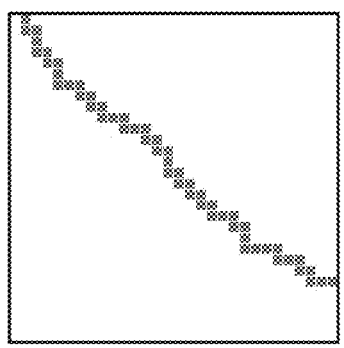
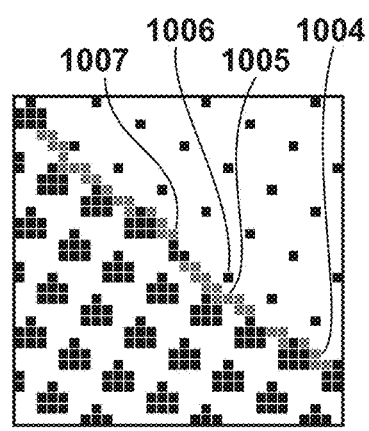
FIG. 10C    FIG. 10D    FIG. 10E
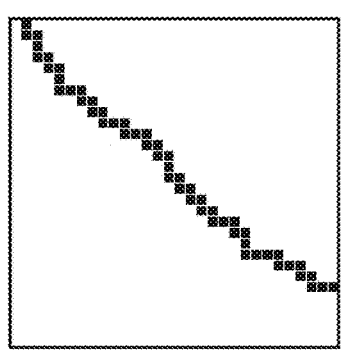
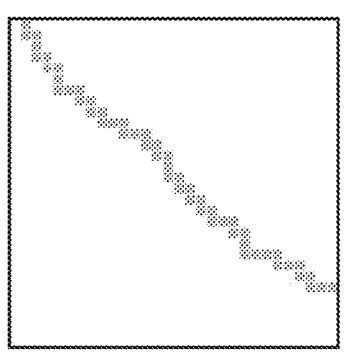
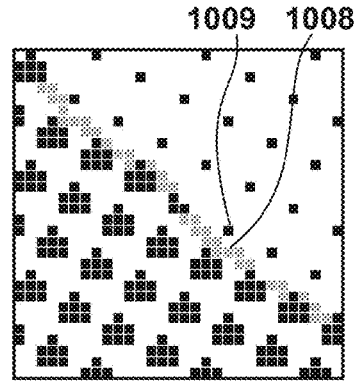
FIG. 10F    FIG. 10G    FIG. 10H

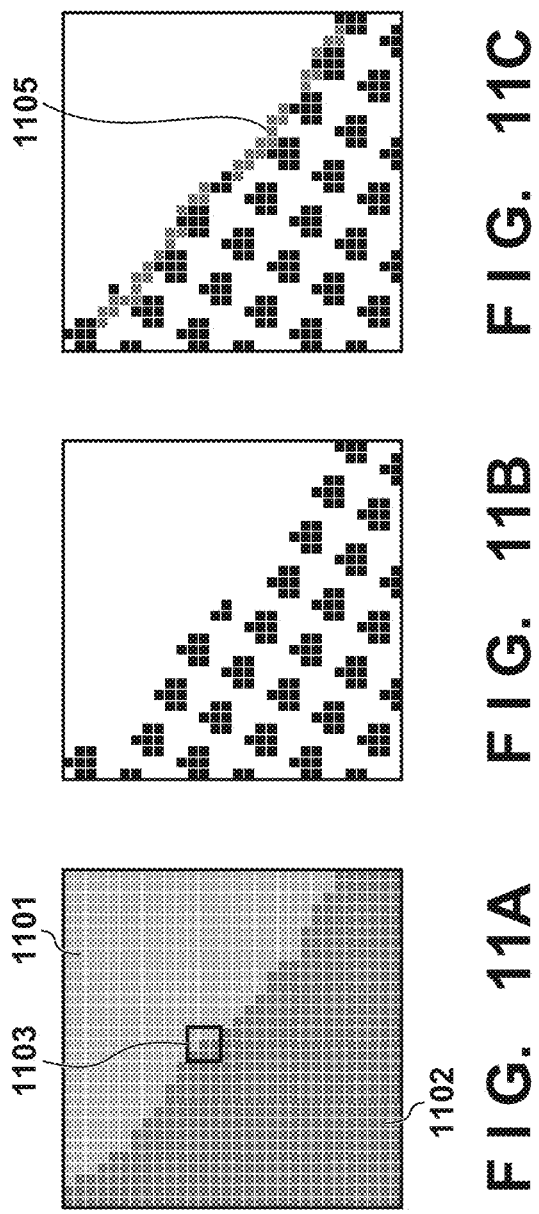

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Conventionally, several techniques for smoothing, in an image forming apparatus, jaggies that occur in an edge portion of text or the like have been proposed. There are various reasons for such jaggies to occur, and it is considered that there are broadly jaggies due to printing by a low-resolution printer, and jaggies caused by halftone processing such as a screening process. One method for halftone processing in image processing is a dither matrix method. This dither matrix method is a method for reproducing a halftone by, with respect to each pixel of image data having a tone, allocating a value indicating black or white based on a certain rule in accordance with a tone value (a pixel value) of the pixel.

As a technique for smoothing jaggies due to the former low-resolution printer, for example, there is something that performs edge detection by pattern matching with respect to a binary image and for a matching portion removes a pixel or adds a pixel corresponding to a pattern (for example, refer to Japanese Patent Laid-Open No. H10-42141). This detects a portion in which jaggies occur, sets the pixel data of the portion to be data that divides one pixel into a plurality of pixels in the case of a binary printer, and performs smoothing of the edge portion by the plurality of pixels. In the case of a multi-value printer, dots of an intermediate level are added to pixels of an edge portion to realize smoothing processing of the edge portion.

In addition, as a technique for smoothing jaggies due to the latter halftone processing, for example, there is one that generates correction data from image data before halftone processing and adds the correction data to an edge portion of the image data after the halftone processing so as to outline (for example, refer to Japanese Patent Laid-Open No. 2006-295877). This is something for smoothing jaggies due to the screening process by, with respect to an edge portion to which smoothing processing should be performed, comparing the correction data and the image data after halftone processing, and outputting data having the larger value.

However, in the foregoing method, while it is possible to ameliorate jaggies due to the screening process, if the background of the edge portion (outside of the edge) is not white, there is a possibility that the screening process and correction processing of the edge interfere, and lead to deterioration of the image. Specifically, if the background of the edge portion is white, correction data is added to the edge portion, and because the correction data only receives influence from a screening process of an inside the edge portion, an amelioration effect of the jaggies is higher than deterioration of the image. However, if the background of the edge portion is not white, because the added correction data also receives influence from a screening process of the background of the edge portion and not just influence from a screening process of the inside of the edge portion, pixel values corresponding to a unit area of the edge portion become larger than those in the vicinity of the edge portion. Thus, this leads to an increase of a density of the edge portion in comparison to the vicinity, and deterioration of the image.

SUMMARY OF THE INVENTION

An aspect of the present invention is to eliminate the above-mentioned problems with conventional technology.

A feature of the present invention is to provide a technique for performing edge correction by making an influence of a density value of a pixel of a background of an edge portion of image data small.

According to a first aspect of the present invention, there is provided an image processing apparatus comprising: at least one memory storing a program; at least one processor executes the program stored in the at least one memory to act as: a determination unit configured to determine, based on a threshold and values of a plurality of pixels in a reference area that includes a target pixel of first image data, whether or not the target pixel is included in an edge portion; a halftone processing unit configured to generate second image data by performing halftone processing on the first image data; and a correction unit configured to use correction data generated based on a value of the target pixel to correct a pixel value of the second image data corresponding to the target pixel determined to be included in the edge portion by the determination unit, wherein the threshold is determined by using values determined based on values of the plurality of pixels in the reference area.

According to a second aspect of the present invention, there is provided an image processing apparatus comprising: a determination unit configured to determine, based on a threshold and values of a plurality of pixels in a reference area that includes a target pixel of first image data, whether or not the target pixel is included in an edge portion; a halftone processing unit configured to generate second image data by performing halftone processing on the first image data; and a correction unit configured to use edge correction data generated based on a value of the target pixel to correct a pixel value of the second image data corresponding to the target pixel determined to be included in the edge portion by the determination unit, wherein the correction unit controls a correction amount based on a minimum density value of the plurality of pixels in the reference area.

According to a third aspect of the present invention, there is provided a method of controlling an image processing apparatus, the method comprising: determining, based on a threshold and values of a plurality of pixels in a reference area that includes a target pixel of first image data, whether or not the target pixel is included in an edge portion; generating second image data by performing halftone processing on the first image data; and correcting a pixel value of the second image data corresponding to the target pixel determined to be included in the edge portion, using correction data generated based on a value of the target pixel, wherein the threshold is determined by using values determined based on values of the plurality of pixels in the reference area.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A through FIG. 9H depict views for explaining the embodiment in comparison to a conventional technique.

FIG. 10A through FIG. 10H depict views for explaining the embodiment in comparison to a conventional technique.

FIG. 11A through FIG. 11C depict views for explaining edge correction processing in the present embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

In the present embodiment, explanation is given of an electrophotographic method digital multi-function peripheral (hereinafter, MFP) having a plurality of functions such as copying, printing, and FAX, as an example of an image processing apparatus according to the present invention. However, the present invention is not limited to this, and can also be applied to a device that uses another process such as an ink-jet method for example, or an information processing apparatus such as a PC.

Figure 1:
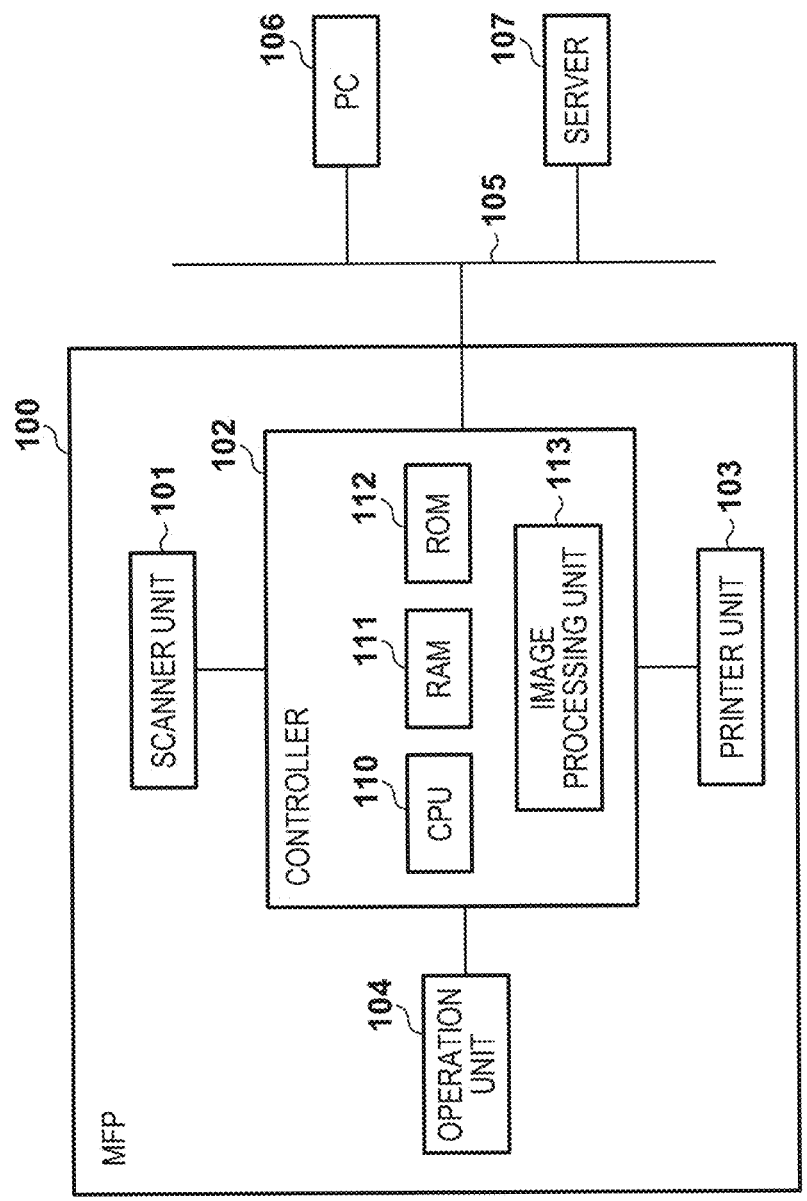
FIG. 1 is a block diagram for describing a configuration of an MFP and a system that includes the MFP according to an embodiment.

FIG. 1 is a block diagram illustrating a configuration of an MFP 100 according to the embodiment, and a configuration of a system that includes the MFP 100.

The MFP 100 has a scanner unit 101, a controller 102, a printer unit 103, and an operation unit 104. The scanner unit 101 optically reads an image of an original, converts the image into image data, and outputs. The controller 102 is equipped with a CPU 110, a RAM 111, and a ROM 112. An image processing unit 113 performs predetermined image processing on, for example, image data of an original output from the scanner unit 101, and stores image data for which the image processing has been performed in the RAM 111.

This image processing unit 113 may be configured by hardware for example, or may be realized by the CPU 110 executing a program. A printer unit 103 receives image data to which image processing has been performed, and, in accordance with a designated print setting, forms (prints) an image on a sheet by the electrophotographic method for example. In the printer unit 103 according to this embodiment, it is assumed that an exposure amount of a laser is adjusted in accordance with an image signal to which PWM (pulse width modulation) has been performed, and image data having 4 bits for each pixel is input. The operation unit 104 provides a user interface for a user to perform various operations, and a user performs various print settings or the like with respect to image data of a print target via the operation unit 104.

Additionally, a server 107 for managing image data via the network 105 and a personal computer (PC) 106 or the like for causing the MFP 100 to print are connected to the MFP 100. Upon execution of printing being instructed from the server 107 or the PC 106, the controller 102 rasterizes image data transmitted from the server 107 or the PC 106 to convert it into image data (bitmap data) supported by the printer unit 103, and stores it in the RAM 111. By synchronizing with operation of the printer unit 103, reading the image data from the RAM 111 and transmitting it to the printer unit 103, a print process based on the print instruction from the server 107 or the PC 106 is executed.

Next, explanation is given regarding image processing for printing executed by the controller 102.

Figure 2:
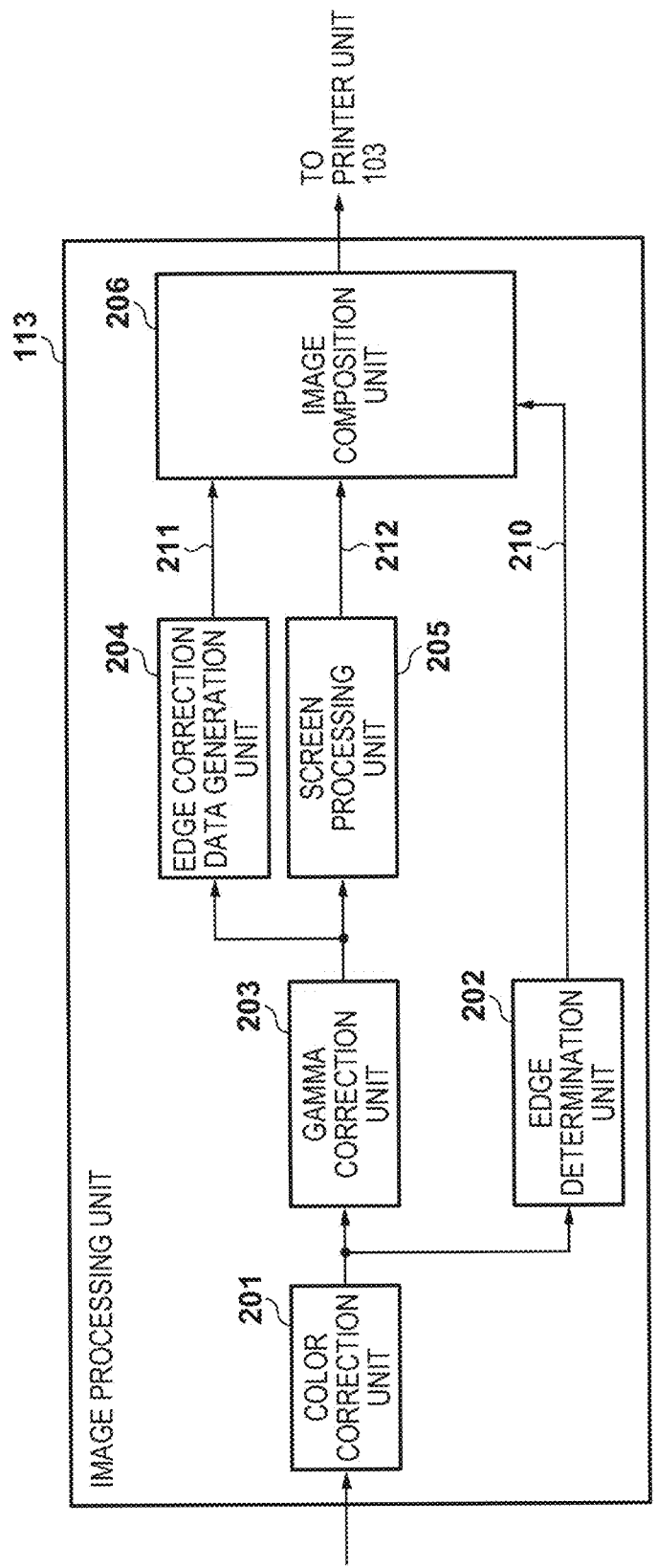
FIG. 2 is a block diagram for describing a functional configuration of an image processing unit according to the embodiment of the present invention.

FIG. 2 is a block diagram for describing a functional configuration of the image processing unit 113 according to the embodiment of the present invention.

Here the image processing unit 113 according to this embodiment has a color correction unit 201, an edge determination unit 202, a gamma correction unit 203, an edge correction data generation unit 204, a screen processing unit 205, and an image composition unit 206.

The color correction unit 201 performs color correction processing with respect to image data obtained from the RAM 111 (bitmap data). Specifically, conversion is made to image data of a CMYK color space that represents density by four types of color CMYK (an image signal) in accordance with a color conversion LUT (lookup table) or a matrix operation. Image data converted in this way has an 8-bit (0 through 255) value for each pixel of each color. The edge determination unit 202 determines whether or not there is an edge between a target pixel that is a determination target and reference pixels therearound. A region that includes these reference pixels may be a region of 3×3 pixels centered on the target pixel as illustrated by regions 903 or 1003 of FIG. 9A and FIG. 10A for example, or may be a region of 5×5 pixels or more. A result of this determination is output as an edge determination signal 210 to the image composition unit 206. Here, if an edge is determined, the edge determination signal 210 is set to "1" (on), and if not an edge is determined, the edge determination signal 210 is set to "0" (off).

The gamma correction unit 203 uses a one-dimensional lookup table to perform gamma correction processing on input CMYK image data so that a desired density characteristic is achieved when an image is transferred to a sheet. Image data to which the gamma correction processing has been performed is sent to the edge correction data generation unit 204 and the screen processing unit 205. The edge correction data generation unit 204 generates correction data (hereinafter, edge correction data) 211 for the edge portion from the input image data. This edge correction data 211 is sent to the image composition unit 206. The screen processing unit 205 performs a screening process on the input image data, and generates screened data (halftone image data) 212. The generated screened data 212 is sent to the image composition unit 206. The image composition unit 206 performs later-described image composition processing based on the edge determination signal 210 received from the edge determination unit 202.

Figure 3:
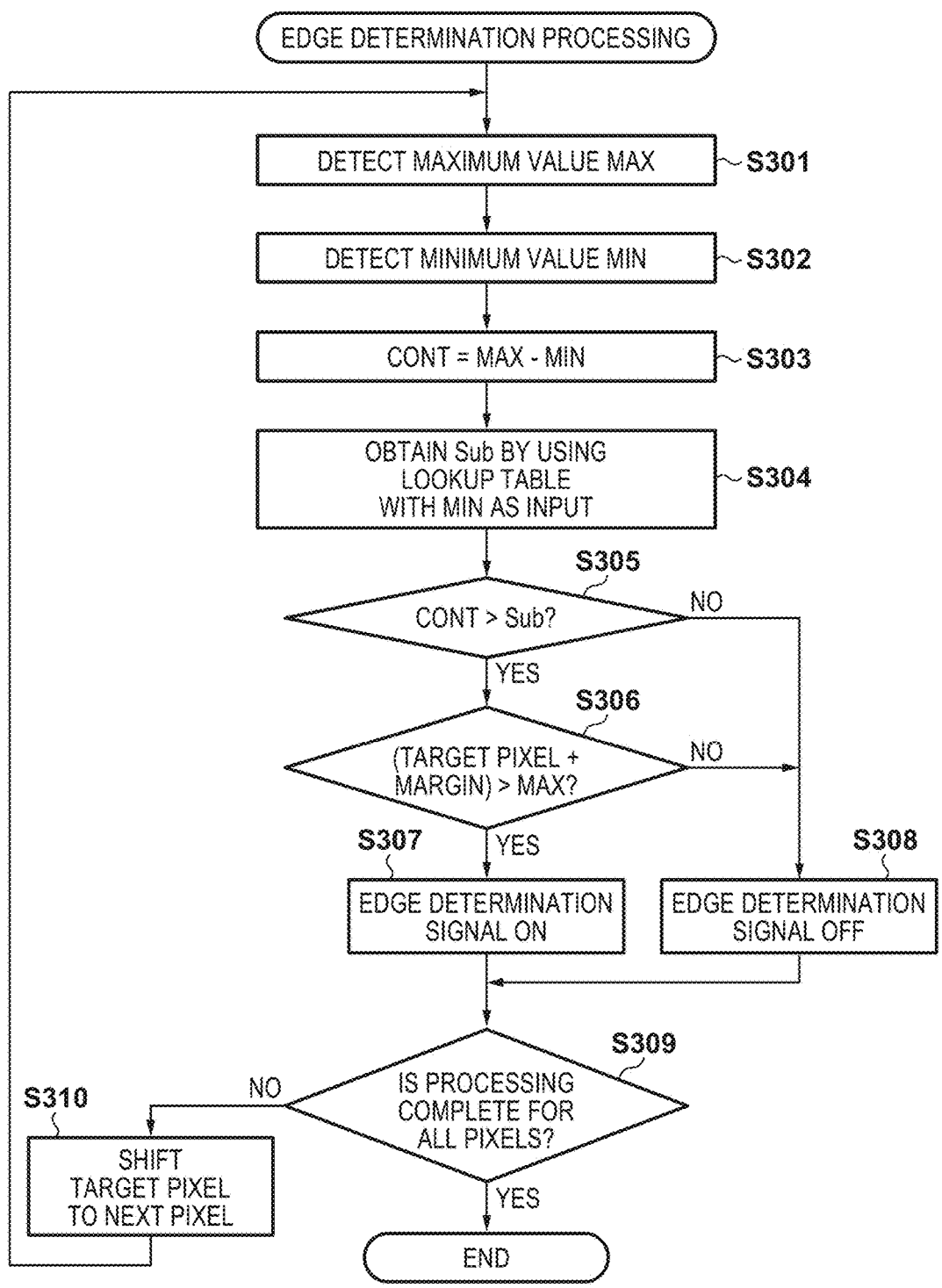
FIG. 3 is a flowchart for describing edge determination processing performed by an edge determination unit according to the embodiment.

Next, with reference to FIG. 3, explanation is given in detail of edge determination processing by the edge determination unit 202 according to embodiments.

FIG. 3 is a flowchart for describing edge determination processing performed by the edge determination unit 202 according to the embodiment. Note that processing of the edge determination unit 202 is described as something achieved by the CPU 110 executing a program. Therefore this processing is assumed to be something achieved by the CPU 110 executing a program stored in the ROM 112.

Firstly, in step S301, the CPU 110 obtains a pixel value having a largest density value (a maximum value [MAX]) from 3 pixels×3 pixels–a total of 9 pixels–centered on the target pixel in reference area, in the image data input from the color correction unit 201. Next, the processing proceeds to step S302, and the CPU 110 obtains a pixel value having a smallest density value (a minimum value [MIN]) from 3 pixels×3 pixels–a total of 9 pixels–centered on the target pixel in the reference area, in the image data input from the color correction unit 201. The maximum value and the minimum value are obtained for calculating a step of the signal values of the reference area. Next, the processing proceeds to step S303, and the CPU 110 subtracts the minimum value [MIN] obtained in step S302 from the maximum value [MAX] obtained in step S301 to obtain a contrast value [CONT] that is a difference therebetween. The contrast value [CONT] indicates a maximum step amount of the signal values of the reference area.

Next the processing proceeds to step S304 and the CPU 110 obtains an edge determination value [Sub] by using a one-dimensional lookup table having as input the minimum value [MIN] obtained in step S302. Here, the edge determination value [Sub] is a threshold for determining an edge portion of an object, and is a threshold for determining whether or not there is an edge portion of a line or text for example. Next the processing proceeds to step S305, and the CPU 110 compares the contrast value [CONT] obtained in step S303 and the edge determination value [Sub] obtained in step S304 to determine whether or not the contrast value [CONT] is larger than the [Sub]. If it is determined that the contrast value [CONT] is larger than the edge determination value [Sub], the processing proceeds to step S306, and processing for finalization of whether or not there is an edge portion is performed. Meanwhile, if the contrast value [CONT] is not larger than the edge determination value [Sub], the processing proceeds to step S308. In such a case, it is determined that there is no edge portion and it is determined that edge correction processing is not necessary.

In step S306 the CPU 110 compares the maximum value [MAX] obtained in step S301 with a value achieved by adding a predetermined value [Margin] to the signal value of the target pixel, to determine whether or not the value achieved by adding the predetermined value [Margin] to the signal value of the target pixel is larger than the maximum value [MAX]. If it is determined that the value achieved by adding the predetermined value [Margin] to the signal value of the target pixel is larger, it is determined that edge correction processing is necessary and the processing proceeds to step S307, otherwise the processing proceeds to step S308. In step S307 the CPU 110 sets the edge determination signal 210 to "1" (on), and the processing proceeds to step S309. Meanwhile, in step S308 the CPU 110 sets the edge determination signal 210 to "0" (off), and the processing proceeds to step S309. In step S309 the CPU 110 determines whether or not the above-described processing has been performed on all pixels, and if processing is not finished for all pixels the processing proceeds to step S310, the target pixel is shifted to the next pixel, and the previously described processing of step S301 to step S309 is executed. In this way, if is determined in step S309 that processing with respect to all pixels has terminated, this processing terminates.

By this processing, when a difference between the maximum density value and the minimum density value of a pixel in the reference area is larger than an edge determination value (a threshold) and a density of a target pixel in the reference area is close to the maximum density value, it is determined that the reference area includes an edge portion. In addition, as described later, the edge determination value (threshold) is decided in accordance with the minimum density value (minimum value [MIN]) in the previously described reference area.

Note that, although indication is not given in FIG. 3, if a white pixel is not included in the reference area, it may be determined that the reference area does not include an edge.

Next explanation is given in detail of a concrete example of edge determination processing according to this embodiment, with reference to FIG. 4, FIGS. 9A-9H, and FIGS. 10A-10H.

Figure 4:
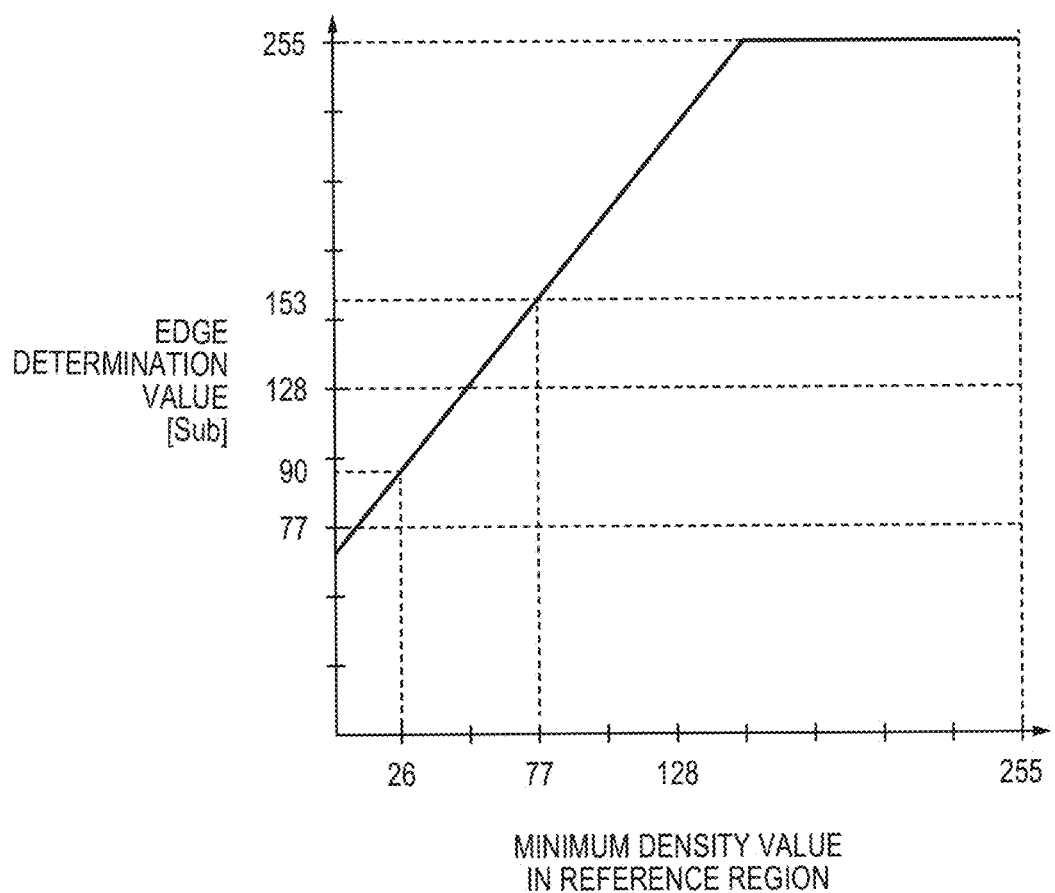
FIG. 4 depicts a view illustrating an example of a one dimensional lookup table for generating an edge determination value [Sub].

FIG. 4 depicts a view illustrating an example of a one dimensional lookup table for generating the edge determination value [Sub].

Here, an example of obtaining the edge determination value [Sub] based on the minimum value [MIN] obtained in step S302 and a one-dimensional lookup table is described. For example, if the minimum value [MIN] is "77", the edge determination value [Sub] is determined to be "153". Here a pixel value is 8 bits. In this way, here the smaller the minimum value [MIN] obtained in step S302 is, the smaller the edge determination value [Sub] is set to be.

FIGS. 9A-9H and FIGS. 10A-10H depict views for explaining the embodiment in comparison to a conventional technique.

FIG. 9A illustrates 8-bit image data input to the edge determination unit 202. For an image region 901 the density is "77", and for an image region 902 the density is "153".

FIG. 9B illustrates an output result of the screen processing unit 205 when the image data illustrated in FIG. 9A is input. FIG. 9C illustrates an output result of an edge determination unit when edge determination by a conventional technique is applied. FIG. 9D illustrates an output result of an edge correction data generation unit in a case where edge correction data generation processing by a conventional technique is applied. FIG. 9E illustrates an output result of an image composition unit when image composition processing by a conventional technique is applied.

FIG. 9F illustrates an output example of an edge determination result ("0" here) by the edge determination unit 202 according to this embodiment. FIG. 9G illustrates an output result ("0" here) of edge correction data generated by the edge correction data generation unit 204 according to this embodiment. FIG. 9H illustrates an output result for the image composition unit 206 according to this embodiment applying image composition processing.

FIGS. 10A-10H depict views illustrating an example of other pixel data, and FIG. 10A illustrates 8-bit image data input to the edge determination unit 202. For an image region 1001 the density is "26", and for an image region 1002 the density is "153". FIG. 10B illustrates an output result of the screen processing unit 205 when the image data illustrated in FIG. 10A is input. FIG. 10C illustrates an output result of an edge determination unit when edge determination processing by a conventional technique is applied. FIG. 10D illustrates an output result of an edge correction data generation unit in a case where edge correction data generation processing by a conventional technique is applied. FIG. 10E illustrates an output result for a case in which image composition processing according to a conventional technique is applied.

FIG. 10F illustrates an output result of edge determination processing by the edge determination unit 202 according to this embodiment. FIG. 10G illustrates an output result of edge correction data 211 generated by the edge correction data generation unit 204 according to this embodiment. FIG. 10H illustrates an output result for the image composition unit 206 according to this embodiment applying image composition processing.

In FIGS. 9A-9H and FIGS. 10A-10H, the maximum value [MAX] of the reference region 903 and the reference region 1003 is "153" for both. Also, the minimum value [MIN] of the reference region 903 is "77", and the minimum value [MIN] of the reference region 1003 is "26". Because of this, the contrast [CONT] of the reference region 903 becomes 153−77=76, and the contrast [CONT] of the reference region 1003 becomes 153−26=127. In addition, in step S304 of FIG. 3, the edge determination value [Sub] of the reference region 903 becomes "153" from the lookup table illustrated in FIG. 4 because the minimum value [MIN] is "77". However, the edge determination value [Sub] of the reference region 1003 becomes "90" from the lookup table illustrated in FIG. 4 because the minimum value [MIN] is "26". In this way, as the value of the minimum density value [MIN] of the reference area becomes larger, the edge determination value [Sub] becomes larger, and as the value of the minimum density value [MIN] becomes smaller, the edge determination value [Sub] becomes smaller. Because of this, control is performed such that, when the density of the background of an edge portion is low, it becomes easier to determine an edge because an effect of interference is small, and when the density of the background of the edge portion is high it becomes harder to determine an edge because interference becomes larger.

In contrast to this, in the conventional technique the edge determination value [Sub] is a predetermined value and is fixed to "70" for example. In other words, in the conventional technique the edge determination value [Sub] is constant regardless of the density of the background of an edge portion, and interference between edge correction processing and screening is not considered.

Next, in the case of the reference region 903 of FIG. 9A, in step S305 of FIG. 3 comparison is made between contrast [CONT]="76" and the edge determination value [Sub]="153", and in this case the processing proceeds to step S308 because the edge determination value [Sub] is larger than the contrast [CONT], and the target pixel is determined to be a non-edge. In addition, in the case of the reference region 1003 of FIG. 10A, in step S305 comparison is made between contrast [CONT]="127" and the edge determination value [Sub]="90", the processing proceeds to step S306 because contrast [CONT] is larger, and the target pixel is determined to be an edge.

In contrast to this, in the case of the conventional technique, in both the cases of the reference region 903 and the reference region 1003 the processing proceeds to step S307 because contrast [CONT] is larger than the edge determination value [Sub]="70", and the target pixel is determined to be an edge.

In this way, in the present embodiment, the target pixel of the reference region 1003 of FIG. 10A is determined to be an edge, the edge determination signal 210 is set to be "1" (ON), and this processing terminates. FIG. 10F illustrates an output result of the edge determination signal 210 that is output from the edge determination unit 202 according to this embodiment.

However, in the case of the conventional technique, because the target pixels of the reference region 1003 and the reference region 903 are both determined to be an edge, the edge determination signal 210 is set to be "1" (ON), and this processing terminates. FIG. 9C and FIG. 10C illustrate output results of edge determination signals output from the edge determination unit in the conventional technique.

In this way, in the present embodiment, the target pixel of the reference region 903 of FIG. 9A is determined to be an non-edge, the edge determination signal 210 is set to be "0" (OFF), and this processing terminates. FIG. 9F illustrates an output result ("0" here) of the edge determination signal 210 that is output from the edge determination unit 202 according to this embodiment.

In this way, as is clear from FIG. 9C and FIG. 9F, it is understood that a step of an image determined to be an edge in the conventional technique is determined to be a non-edge in the present embodiment. Because of this, by virtue of this embodiment, as is clear upon comparing FIG. 9E and FIG. 9H, because edge correction data is not output in FIG. 9H, it is possible to prevent deterioration of an image by preventing interference of edge correction processing and a screening process.

Figure 5:
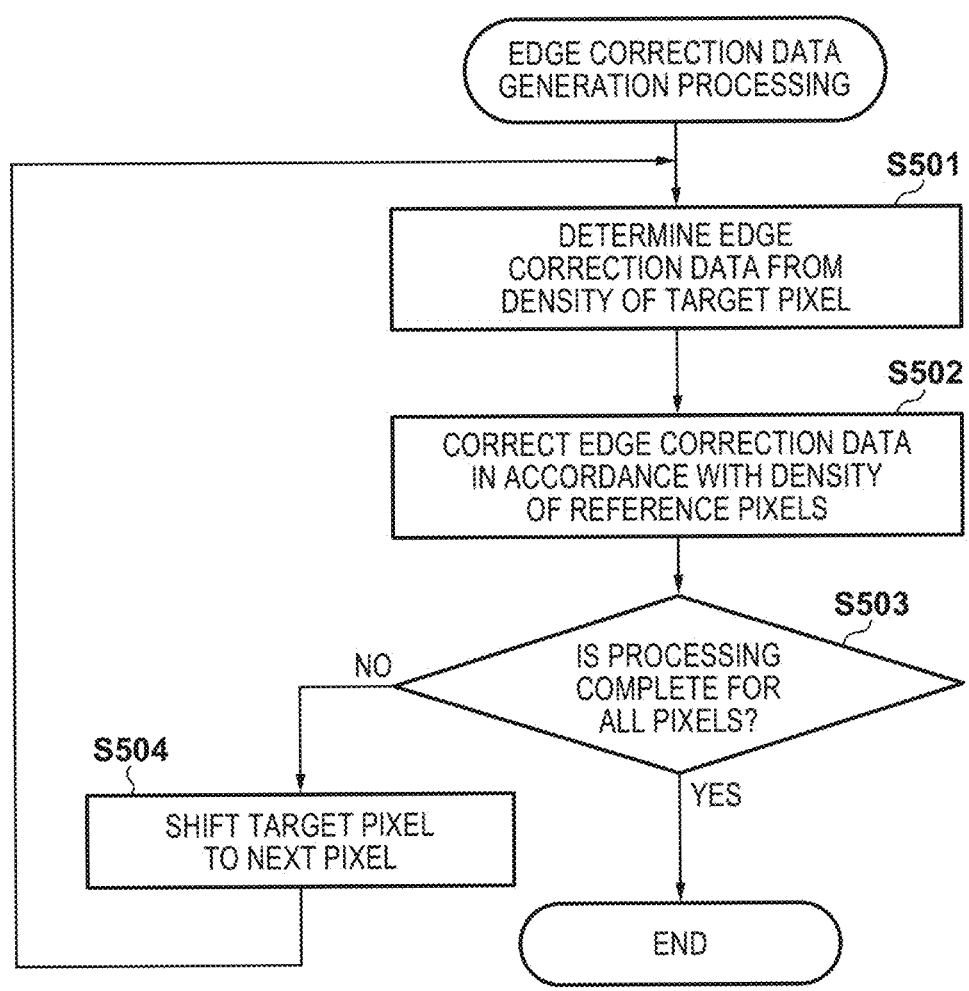
FIG. 5 is a flowchart for describing processing for generating edge correction data performed by an edge correction data generation unit according to the embodiment.
Figure 6:
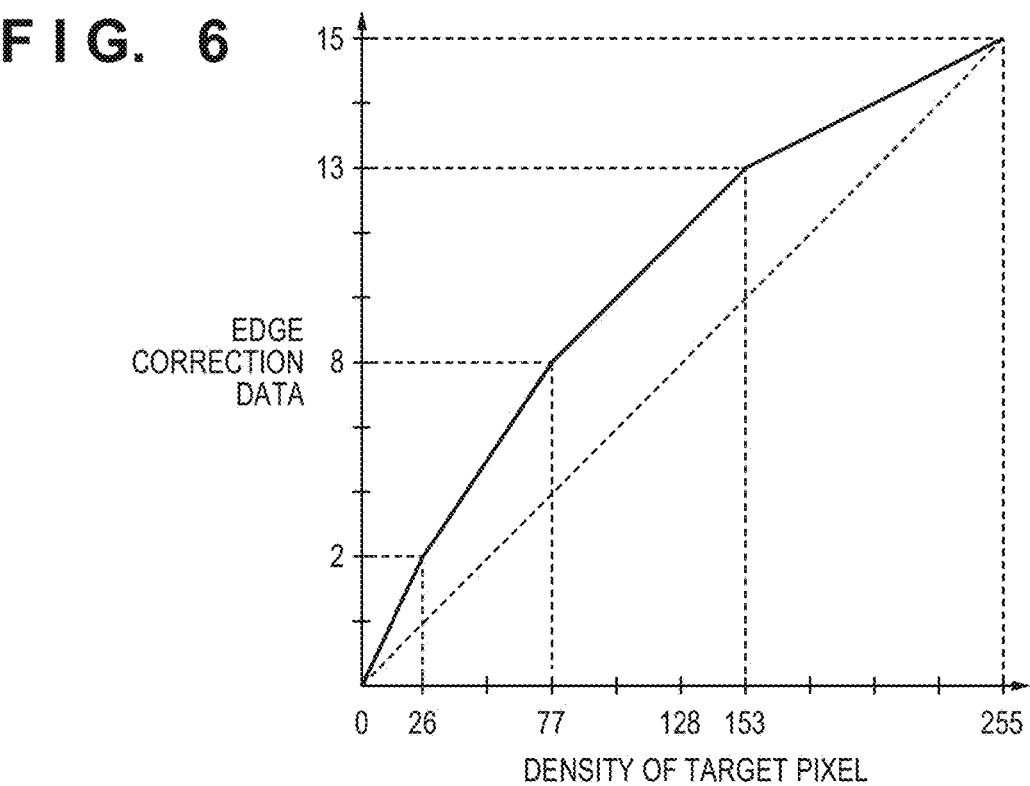
FIG. 6 depicts a view illustrating an example of a lookup table for outputting edge correction data with respect to a density of a target pixel.
Figure 7:
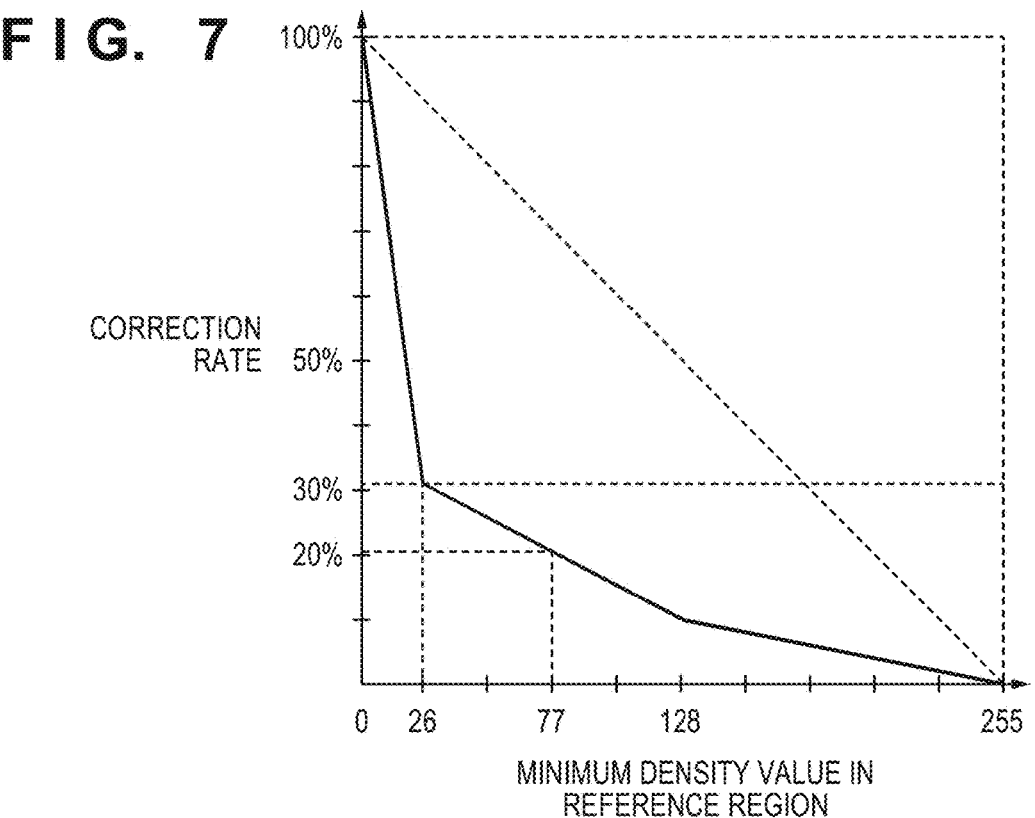
FIG. 7 depicts a view illustrating an example of a lookup table for outputting a correction rate with respect to a minimum density value of a reference area.

Next, with reference to FIGS. 5 through 7, explanation is given in detail of the generation processing of edge correction data according to the edge correction data generation unit 204 according to the embodiment.

FIG. 5 is a flowchart for describing generation processing for edge correction data that is performed by the edge correction data generation unit 204 according to the embodiment. FIG. 6 and FIG. 7 depict views illustrating examples of lookup tables used in generation processing for edge correction data. Note that, in the present embodiment, this processing is assumed to be something achieved by the CPU 110 executing a program stored in the ROM 112.

Firstly, in step S501 the CPU 110 refers to a table prepared in advance or the like (for example a one-dimensional lookup table: LUT) to generate edge correction data. Specifically, reference is made to an LUT, as illustrated in FIG. 6 for example, having as input a density of the target pixel and has an output edge correction data to generate edge correction data. Next, the processing proceeds to step S502, and the CPU 110 corrects edge correction data generated in step S501 by referring to the table prepared in advance or the like. Specifically, an LUT as illustrated in FIG. 7 having as input the minimum density value of a reference area and having as output a correction rate (a correction amount) is used to perform the correction. Next the processing proceeds to step S503, and the CPU 110 determines whether or not the above-described processing has been performed on all pixels, and if processing is not completed for all pixels, the processing proceeds to step S504, and if processing for all pixels has completed, this processing terminates. In step S504 the CPU 110 shifts the target pixel to the next pixel, the processing proceeds to step S501, and the previously described processing is executed again.

The above is the detail of the generation processing for edge correction data in accordance with the edge correction data generation unit 204 according to the embodiment. Next explanation is given of a concrete example of edge determination processing, with reference to the previously described FIGS. 9A-9H and FIGS. 10A-10H. Here, rounding below the decimal point is performed.

In the case of the reference region 903 of FIG. 9A, the density of the target pixel of the reference region 903 in step S501 is "153". Using this density "153", upon referring to the LUT of FIG. 6, edge correction data becomes "13". FIG. 9D illustrates an example of output of the edge correction data in a case of using the conventional technique.

In addition, in the case of the reference region 1003 of FIG. 10A, the density of the target pixel is "153". Using this density "153", upon referring to the LUT of FIG. 6, edge correction data becomes "13". FIG. 10D illustrates an example of output of the edge correction data in a case of using the conventional technique.

Here, because edge correction data aside from the edge portion is not used, only edge correction data of an edge portion is recorded in FIG. 9D and FIG. 10D to make the description easier to understand.

Next, description of the processing of step S502 is given. In the case of the reference region 1003 of FIG. 10A, the minimum density value of the reference area is "26". Here, upon referring to the LUT of FIG. 7, the correction rate (correction amount) becomes 30%. Consequently, in the case of the reference region 1003 of FIG. 10A, a result of correcting the edge correction data in step S502 is 4 (=13× 30%), by multiplying the correction rate (30%) with the edge correction data "13". FIG. 10G illustrates an example of output of the edge correction data 211 according to embodiments.

In this way, in the present embodiment, it is understood that the density of the edge correction data 211 of the edge portion becomes lower (smaller) in comparison to the conventional technique (FIG. 10D).

Figure 8:
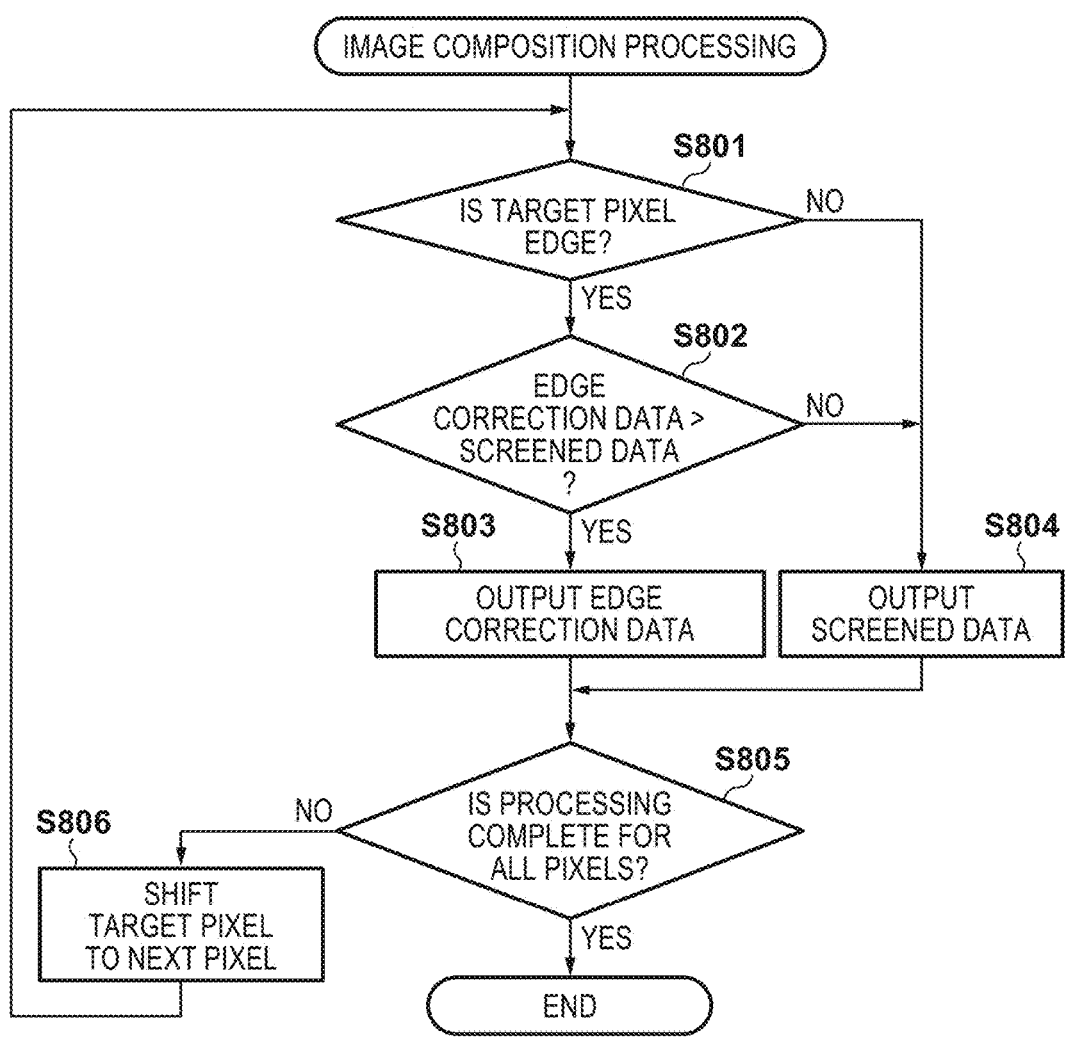
FIG. 8 is a flowchart for describing image composition processing executed by an image composition unit according to the embodiment.

Next, with reference to FIG. 8, explanation is given in detail regarding the image composition processing in the image composition unit 206.

FIG. 8 is a flowchart for describing image composition processing executed by the image composition unit 206 according to the embodiment. Note that this processing is, in the present embodiment, something achieved by the CPU 110 executing a program stored in the ROM 112.

Firstly, in step S801, the CPU 110 determines whether or not the target pixel is included in an edge portion, based on the edge determination signal 210 input from the edge determination unit 202. If the edge determination signal 210 is determined to be "1", in other words, it is determined that the target pixel is included in an edge portion, then the processing proceeds to step S802, and if the edge determination signal 210 is determined to be "0", in other words, it is determined that the target pixel is not an edge portion, then the processing proceeds to step S804. In step S802, the CPU 110 compared the edge correction data with screened data, and determines whether or not the edge correction data is larger than the screened data. Here, if it is determined that the edge correction data is larger than the screened data, the processing proceeds to step S803. However, if it is determined that the screened data is equal to or larger than the edge correction data, the processing proceeds to step S804. In step S803 the CPU 110 outputs the edge correction data as the output of the image composition unit 206, and the processing proceeds to step S805. Meanwhile, in step S804 the CPU 110 outputs the screened data as the output of the image composition unit 206, and the processing proceeds to step S805. In step S805 the CPU 110 determines whether or not the processing has been performed to all pixels, and if processing is not completed for all pixels, the processing proceeds to step S806. In addition, when processing for all pixels has completed, this processing terminates. In step S806 the CPU 110 shifts the target pixel to the next pixel, the processing proceeds to step S801, and the previously described processing is executed again.

The above is the detail of the image composition processing. Here, a concrete example of the image composition processing is explained using FIGS. 9A-9H and FIGS. 10A-10H.

In a conventional technique, edge information of FIG. 9C is referred to, and whether or not the target pixel is an edge is determined (step S801). In step S803 or in step S804, the larger of the screened data of FIG. 9B and the edge correction data of FIG. 9D is output. Ultimately, if image composition processing by the conventional technique is applied, the image output illustrated in FIG. 9E is achieved.

In FIG. 9E, because an edge correction pixel 905 is close to a halftone dot 906, pixels crowd around the halftone dot 906 in comparison to an edge correction pixel 904, an edge correction pixel 907, and the like, and a density difference occurs. This means that the density difference occurs due to position of the edge in accordance with interference between edge correction processing and a dither, and there is a possibility of introducing image degradation.

In contrast to this, in the present embodiment, a non-edge is determined because edge information of FIG. 9F is referred to (step S801). In addition, because as a result of the comparison in step S802, the larger of the screened data of FIG. 9B and the edge correction data of FIG. 9G is output, if image composition processing is performed last, an image output in accordance with the screened data is achieved as illustrated in FIG. 9H. In other words, in the embodiment, as illustrated in FIG. 9F, because there is no pixel determined as an edge, the screened data of FIG. 9B is output as a result of the image composition processing unchanged.

Therefore, it is possible to prevent deterioration of an image due to edge correction as is clear if FIG. 9E and FIG. 9H are compared.

Next explanation is given in accordance with the examples of FIGS. 10A-10H. In a conventional technique, edge information of FIG. 10C is referred to, and whether or not the target pixel is an edge is determined (step S801). In step S803 or in step S804, the larger of the screened data of FIG. 10B and the edge correction data of FIG. 10D is output. Ultimately, if image composition processing by the conventional technique is applied, the image output illustrated in FIG. 10E is achieved.

In FIG. 10E, because an edge correction pixel 1005 is close to a halftone dot 1006, pixels crowd around the halftone dot 1006 in comparison to an edge correction pixel 1004, an edge correction pixel 1007, and the like, and a density difference occurs. This means that the density difference occurs due to position of the edge in accordance with interference between edge correction processing and a dither, and there is a possibility of introducing image degradation.

In contrast to this, in the present embodiment, whether or not there is an edge is determined with reference to the edge information of FIG. 10F (step S801). If an edge is determined, in step S802 through step S804, the larger of the screened data of FIG. 10B and the edge correction data of FIG. 10G is output. Because of this, when the image composition processing is finally applied, image output in accordance with the screened data and the edge correction data is achieved, as illustrated in FIG. 10H. In other words, in the embodiment, as illustrated in FIG. 10H, the screened data and the edge correction data having low density are output as results of the image composition processing.

Therefore, it is possible to suppress deterioration of an image due to edge correction as is clear if FIG. 10E and FIG. 10H are compared.

Next explanation is given of a case in which the background of an edge portion is white, with reference to FIGS. 11A through 11C.

FIG. 11A illustrates 8-bit image data input to the edge determination unit 202. For an image region 1101 the density is "0", and for an image region 1102 the density is "153". FIG. 11B illustrates an output result of the screen processing unit 205 when this image data is input. FIG. 11C illustrates an output result of an image composition processing unit when image composition processing by a conventional technique is applied.

When the background of an edge portion is white, there is no problem because there are no pixels such as the halftone dot 906 of FIG. 9E, for example, which interfere with an edge correction pixel 1105.

In a conventional technique, edge information of FIG. 10C is referred to, and whether or not a target pixel 1103 is an edge is determined (step S801). Next, in step S802, the larger of the screened data of FIG. 10B and the edge correction data of FIG. 10D is output. Ultimately, if image composition processing by the conventional technique is applied, the image output illustrated in FIG. 10E is achieved.

In FIG. 10E, because edge correction pixel 1005 is close to a halftone dot 1006, pixels crowd around the halftone dot 1006 in comparison to the edge correction pixel 1004, the edge correction pixel 1007, and the like, and a density difference occurs. This means that the density difference occurs due to position of the edge in accordance with interference between edge correction processing and a dither, and there is a possibility of introducing image degradation.

In contrast to this, in the embodiment, in step S801, edge information of FIG. 10F is referred to in order to determined whether or not the target pixel 1103 is an edge. The processing proceeds to step S802, and the larger of the screened data of FIG. 10B and the edge correction data of FIG. 10G is output. Thus, ultimately, if image composition processing by the present embodiment is applied, the image output illustrated in FIG. 10H is achieved.

In FIG. 10H, edge correction data 1008 is close to a halftone dot 1009 similarly to the edge correction pixel 1005 of FIG. 10E. However, in the embodiment, because the edge correction data is corrected by the correction rate previously described, for example, corrected from "13" to "4" (=13× 30%), it is possible to make interference between edge correction and screened data be a minimum.

As described above, conventionally there was a problem in that, when edge correction processing is applied to an edge for which a density of a background of an edge portion is larger than zero and a density difference between a pixel of the background of the edge portion and a pixel of the edge portion is sufficient, edge correction processing and a screening process interfere and a harmful effect occurs.

In contrast to this, in the embodiment, the edge determination value [Sub] for determining whether or not an edge is present is decided in accordance with a minimum density value [MIN] of a reference area, and edge determination is executed based on the decided edge determination value [Sub]. In addition, by further deciding a correction amount of edge correction data in accordance with the minimum density value [MIN] of the reference area and correcting the edge correction data in accordance with the correction amount, it is possible to reduce interference between edge correction processing and screening as illustrated in FIG. 9H or FIG. 10H, for example.

In addition, in the embodiment, the correction amount of the edge correction data is set as a value in accordance with the minimum density value [MIN] of the reference area, and the edge correction data is corrected in accordance with the correction amount. Because of this, it is possible to gradually perform outlining of an edge with respect to image data near a threshold where edge correction processing is necessary, and it is possible to make it inconspicuous a change between a portion determined to be an edge and a portion where that is not an edge.

Note that, in the embodiment, an edge determination value (threshold) is decided in accordance with the minimum density value of a pixel of a reference area, but configuration may be taken to determine a non-edge if the minimum density value of a pixel of the reference area is greater than or equal to a certain density value. In addition, if the minimum density value of a pixel of the reference area is not white, it may be determined as a non-edge.

Note that, in the embodiment, although explanation was given by only raising an example of one color, it goes without saying that it may be a mixture of colors.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-227067, filed Nov. 19, 2015, which is hereby incorporated by reference herein in its entirety.

What is claimed is:

1. An image processing apparatus comprising:
 a decision unit configured to decide a threshold value that is used to determine an edge portion based on at least a pixel value having a minimum density in pixel values of a plurality of pixels constituting a reference area, being a part of first image data, including a target pixel and peripheral pixels of the target pixel;
 a determination unit configured to obtain a contrast value indicating a contrast of the reference area based on the pixel values of the plurality of pixels in the reference area, and to compare the contrast value with the threshold value to determine whether or not the target pixel is included in the edge portion;
 a halftone processing unit configured to generate second image data by performing halftone processing on the first image data; and
 a correction unit configured to correct a pixel value of the second image data corresponding to the target pixel determined to be included in the edge portion using correction data generated based on a pixel value of the target pixel.

2. The image processing apparatus according to claim 1, wherein the decision unit decides the threshold value with reference to a look-up table holding a correspondence between a pixel value and the threshold value,
 wherein, in the look-up table, a first threshold corresponding to a first pixel value is smaller than a second threshold corresponding to a second pixel value having a higher density more than the first pixel value.

3. The image processing apparatus according to claim 2, wherein the determination unit obtains the contrast value based on a difference between a pixel value having a maximum density and the pixel value having the minimum density of pixel values of the plurality of pixels constituting the reference area.

4. The image processing apparatus according to claim 1, wherein the determination unit determines that the target pixel is included in the edge portion in a case that a difference between the contrast value and the threshold is larger than a predetermined threshold value.

5. The image processing apparatus according to claim 4, wherein the determination unit does not determine that the target pixel is included in the edge portion in a case that the pixel value of the target pixel is larger a predetermined value or more than a pixel value having a maximum density even if the difference between the contrast value and the threshold is larger than the predetermined threshold value.

6. The image processing apparatus according to claim 1, wherein the correction unit performs correction of the pixel value of the second image data using a larger one of the pixel value of the second image data and a pixel value of the correction data, for the target pixel determined to be included in the edge portion.

7. A method of controlling an image processing apparatus, the method comprising:
 deciding a threshold value that is used to determine an edge portion based on at least a pixel value having a minimum density in pixel values of a plurality of pixels constituting a reference area, being a part of first image data, including a target pixel and peripheral pixels of the target pixel;
 obtaining a contrast value indicating a contrast of the reference area based on the pixel values of the plurality of pixels in the reference area, and comparing the contrast value with the threshold value to determine whether or not the target pixel is included in the edge portion;
 generating second image data by performing halftone processing on the first image data; and
 correcting a pixel value of the second image data corresponding to the target pixel determined to be included in the edge portion, using correction data generated based on a pixel value of the target pixel.

8. A non-transitory computer readable storage medium storing a program for causing a processor to perform a method of controlling an image processing apparatus, the method comprising:
 deciding a threshold value that is used to determine an edge portion based on at least a pixel value having a minimum density in pixel values of a plurality of pixels constituting a reference area, being a part of first image data, including a target pixel and peripheral pixels of the target pixel;
 obtaining a contrast value indicating a contrast of the reference area based on the pixel values of the plurality of pixels in the reference area, and comparing the contrast value with the threshold value to determine whether or not the target pixel is included in the edge portion;
 generating second image data by performing halftone processing on the first image data; and
 correcting a pixel value of the second image data corresponding to the target pixel determined to be included in the edge portion, using correction data generated based on a pixel value of the target pixel.

9. An image processing apparatus comprising at least one circuitry constructed to:
 decide a threshold value that is used to determine an edge portion based on at least a pixel value having a minimum density in pixel values of a plurality of pixels constituting a reference area, being a part of first image data, including a target pixel and peripheral pixels of the target pixel;
 obtain a contrast value indicating a contrast of the reference area based on the pixel values of the plurality of pixels in the reference area;
 compare the contrast value with the threshold value to determine whether or not the target pixel is included in the edge portion;
 generate second image data by performing halftone processing on the first image data; and
 correct a pixel value of the second image data corresponding to the target pixel determined to be included in the edge portion, using correction data generated based on a pixel value of the target pixel.

* * * * *